United States Patent
Hsu et al.

(10) Patent No.: US 7,878,661 B2
(45) Date of Patent: *Feb. 1, 2011

(54) TEMPERATURE ADJUSTING APPARATUS FOR USE IN LCD PROJECTOR AND RELATED METHOD

(75) Inventors: Chien-Wen Hsu, Taipei Hsien (TW);
Shih-Chieh Chou, Taipei Hsien (TW);
Chia-Hung Kao, Taipei Hsien (TW);
Huan-Liang Lo, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 434 days.

This patent is subject to a terminal disclaimer.

(21) Appl. No.: 11/940,891

(22) Filed: Nov. 15, 2007

(65) Prior Publication Data

US 2009/0002641 A1    Jan. 1, 2009

(30) Foreign Application Priority Data

Jun. 29, 2007   (CN) .................. 2007 1 0200973

(51) Int. Cl.
*G03B 21/16* (2006.01)
*G03B 21/18* (2006.01)

(52) U.S. Cl. ............... 353/52; 353/31; 359/443
(58) Field of Classification Search ........... 353/20, 353/31, 81, 85, 82, 52, 119; 359/443; 348/750, 348/751, 744, 757, 743; 349/7, 106
See application file for complete search history.

(56) References Cited

U.S. PATENT DOCUMENTS

| 6,593,957 | B1 * | 7/2003 | Christie | 348/42 |
| 6,862,012 | B1 * | 3/2005 | Funakoshi et al. | 345/88 |
| 7,070,284 | B2 * | 7/2006 | Tanaka et al. | 353/84 |
| 2006/0250625 | A1 * | 11/2006 | Huang | 358/1.9 |

FOREIGN PATENT DOCUMENTS

JP         08149494 A  *  6/1996

* cited by examiner

*Primary Examiner*—Georgia Y Epps
*Assistant Examiner*—Francis M Legasse, Jr.
(74) *Attorney, Agent, or Firm*—Jeffrey T. Knapp

(57) ABSTRACT

A projector includes a projecting lens configured for projecting an image, a controlling unit configured for analyzing a color temperature of the image, and an adjusting unit electrically connected to the controlling unit. The adjusting unit adjusts the color temperature of the image to be identical to a preset color temperature of the projector by changing transmittance of light through the adjusting unit.

9 Claims, 2 Drawing Sheets

TEMPERATURE ADJUSTING APPARATUS FOR USE IN LCD PROJECTOR AND RELATED METHOD

TECHNICAL FIELD

The present invention relates to a projector adjusting apparatus and method thereof and, particularly, to a projector capable of adjusting a color temperature of an image.

BACKGROUND

Many projection systems, such as digital light projectors (DLPs), utilize a white light and a sequential color filter to produce different colors. The color filter, such as a color filter wheel, typically includes segments for each of the primary colors such as red, blue, and green, and spins at a predetermined rate as the white light is projected onto the color filter wheel to produce colored light corresponding to the colors of the color filter wheel. The colored light is projected onto a viewing screen to form an image.

The ratios between the red light, the green light, and the blue light of the colored lights are adjusted to change the color temperature of the image. Different color temperatures can give out different visual perceptions. For example, people tend to harbor a warm feeling when viewing objects in a low color temperature, while they tend to experience a cool feeling when viewing objects in a high color temperature. Therefore, projectors are often provided with a preset, user-selectable, menu for delivering different color temperature to set different visual effects during various operating occasions such as a conference briefing or a movie presentation. Users can select one of the preset values from the menu to adjust the color temperature of the projector.

However, most conventional projectors with such color temperature adjusting capability are only provided with a few preset color temperature values. The color temperature adjustment range is limited by the preset color temperature values. In some circumstances, the preset color temperature is substantially different from user's request. This may lead to colors in images not seeming true to life. Hence, not only the color temperature adjustment range is limited, but also fine adjustment of the color temperature is not possible.

Therefore, it is desired to develop a projector with an adjustable color temperature range for an image of the projector.

SUMMARY

In accordance with a present embodiment, a color temperature adjusting apparatus and method for a projector are disclosed. The projector includes a projecting lens configured for projecting an image, a controlling unit configured for analyzing a color temperature of the image, and an adjusting unit electrically connected to the controlling unit. The adjusting unit adjusts the color temperature of the image to be identical to a preset color temperature by changing transmittance of light through the adjusting unit.

Other advantages and novel features will be drawn from the following detailed description of at least one preferred embodiment, when considered in conjunction with the attached drawings.

BRIEF DESCRIPTION OF THE DRAWINGS

Many aspects of the present color temperature adjusting apparatus can be better understood with reference to the following drawings. The components in the drawings are not necessarily drawn to scale, the emphasis instead being placed upon clearly illustrating the principles of the present color temperature adjusting apparatus. Moreover, in the drawings, like reference numerals designate corresponding parts throughout the several views.

DETAILED DESCRIPTION OF THE PREFERRED EMBODIMENT

Embodiments of the present color temperature adjusting apparatus will now be described in detail below and with reference to the drawings.

Figure 1:
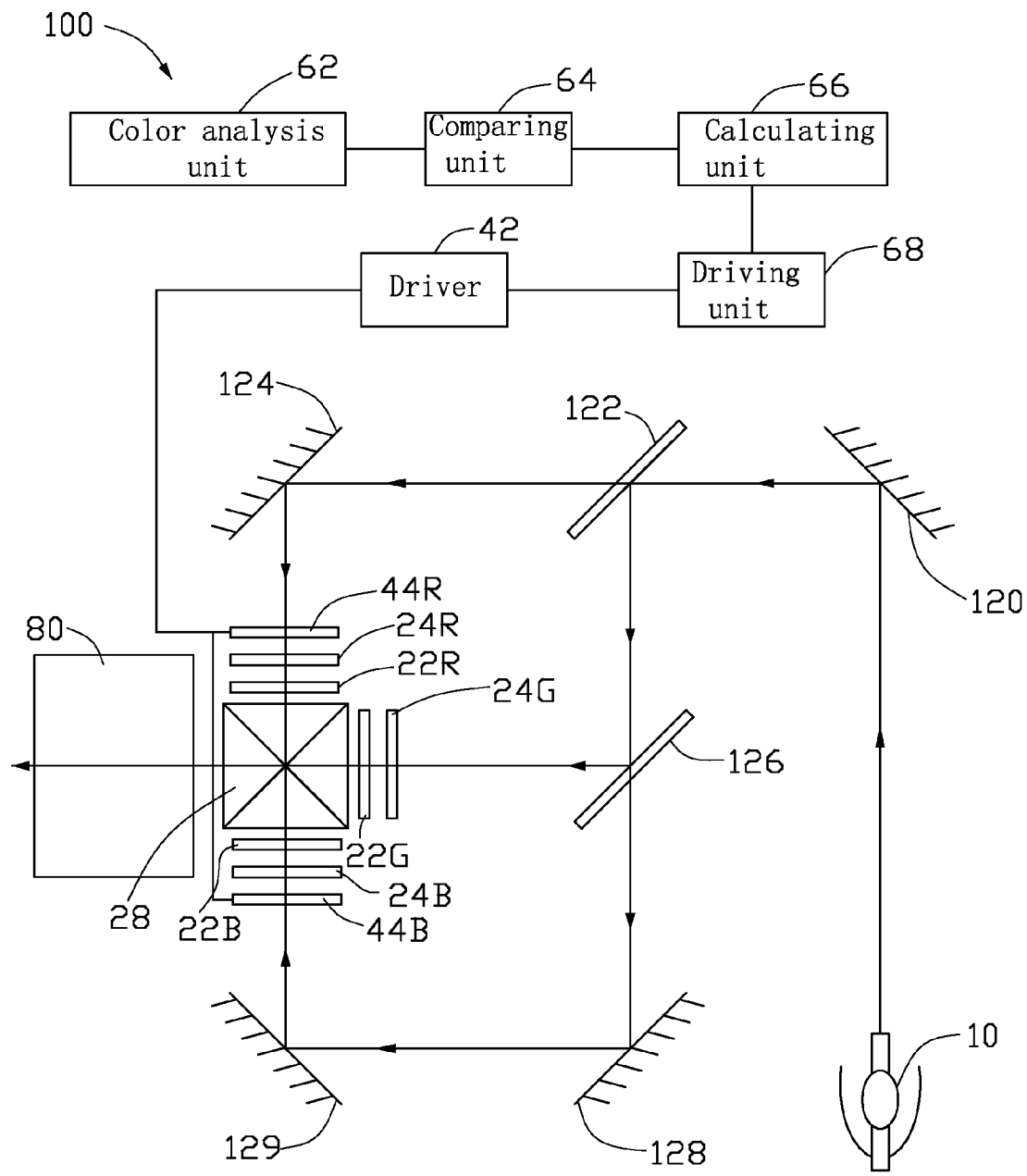
FIG. 1 is a schematic view of a color temperature adjusting apparatus for a projector, according to a present embodiment.

Referring to FIG. 1, a schematic view of a color temperature adjusting apparatus for a projector 100 in accordance with a present embodiment is disclosed. The projector 100 includes a light source 10, a color splitter, a light modulator, a color combiner 28, an adjusting unit, a controlling unit, and a projecting lens 80. The light source 10 is configured for emitting light. The color splitter, the adjusting unit, and the light modulator are respectively arranged on a light transmitting trace of the emitting light for forming an image. The image is projected to a viewing screen through the projecting lens 80.

The color splitter is configured for splitting the emitting light into red, green, and blue lights and includes a first tilted reflecting mirror 120, a first dichroic mirror 122, a second tilted reflecting mirror 124, a second dichroic mirror 126, a third tilted reflecting mirror 128, and a fourth tilted reflecting mirror 129 arranged on a light transmitting trace or a light reflecting trace of the light source 10. Light emitting from the light source 10 is reflected by the first reflecting mirror 120. The first dichroic mirror 122 transmits the red color light of the transmitting light to the second reflecting mirror 124. The red color light is reflected to the color combiner 28 by the second reflecting mirror 124.

The green color light and the blue color light of the transmitting light from the light source 10 are reflected by the first dichroic mirror 122. The second dichroic mirror 126 transmits the blue color light of the transmitting light and reflects the green color light to the color combiner 28. The blue color light transmitting through the second dichroic mirror 126 is reflected to the color combiner 28 by the third reflecting mirror 128 and the fourth reflecting mirror 129.

The light modulator includes a first image displaying module 22R, a first polarizer 24R, a second image displaying module 22B, a second polarizer 24B, a third image displaying module 22G, and a third polarizer 24G. The first image displaying module 22R and the first polarizer 24R are arranged along a light trace of the red color light reflected by the second reflecting mirror 124. The third image displaying module 22G and the third polarizer 24G are arranged along a light trace of the green color light reflected by the second dichroic mirror 126. The second image displaying module 22B and the second polarizer 24B are arranged along a light trace of the blue color light reflected by the fourth reflecting mirror 129.

The color combiner 28, in this embodiment, can be an X-cube dichroic prism configured for recombining the red, green and blue color lights. Light emitting from the light source 10 is transmitted through the color splitter, the light modulator, and the color combiner 28 to form an image projected by the projecting lens 80.

The adjusting unit includes a driver 42 and an adjusting member. The driver 42 is electrically connected to the adjusting member to drive the adjusting member to rotate to a given degree. The adjusting member, e.g. a polarizer or a retarder, is an optical component capable of adjusting its transmittance of light. In this embodiment, the adjusting member is a polarizer and comprises a first adjusting member 44R and a second adjusting member 44B. The first adjusting member 44R is sequentially arranged with the first polarizer 24R and the first image displaying module 22R along the light trace of the red light reflected by the second reflecting mirror 124. The second adjusting member 44B is sequentially arranged with the second polarizer 24B and the second image displaying module 22B along the light trace of the blue light reflected by the fourth reflecting mirror 129.

The controlling unit includes a color analysis unit 62, a comparing unit 64, a calculating unit 66, and a driving unit 68. The color analysis unit 62, the comparing unit 64, the calculating unit 66, and the driving unit 68 are electrically connected in turn. The color analysis unit 62 is configured for analyzing the image to obtain a color temperature and color chromaticity coordinates of the image. The comparing unit 64 is configured for making a comparison between the color temperature obtained from the analysis unit 62 and a preset color temperature.

If the color temperature of the image obtained by the analysis unit 62 is lower than the preset color temperature, the calculating unit 66 calculates a driving voltage according to the color chromaticity coordinates of the image to drive the first adjusting member 44R. The driving unit 68 drives the first adjusting member 44R to rotate to a given degree according to the driving voltage for reducing the transmittance of the red light. The color temperature of the image is then adjusted to be essentially identical to that of the preset color temperature.

If the color temperature of the image obtained by the analysis unit 62 is higher than the preset color temperature, the calculating unit 66 calculates a driving voltage according to the color chromaticity coordinates of the image to drive the second adjusting member 44B. The driving unit 68 drives the second adjusting member 44B to rotate to a given degree according to the driving voltage for reducing the transmittance of the blue light. The color temperature of the image is then adjusted to be essentially identical to that of the preset color temperature.

The adjusting unit may further include a third adjusting member sequentially arranged with the third polarizer 24G and the third image displaying module 22G along the light trace of the green light reflected by the second dichroic mirror 126.

Of course, the adjusting unit may only include a first adjusting member 44R sequentially arranged with the first polarizer 24R and the first image displaying module 22R along the light trace of the red light reflected by the second dichroic mirror 126. Alternatively, the adjusting unit may only include a second adjusting member 44B sequentially arranged with the second polarizer 24B and the second image displaying module 22B along the light trace of the blue light reflected by the fourth reflecting mirror 129.

Figure 2:
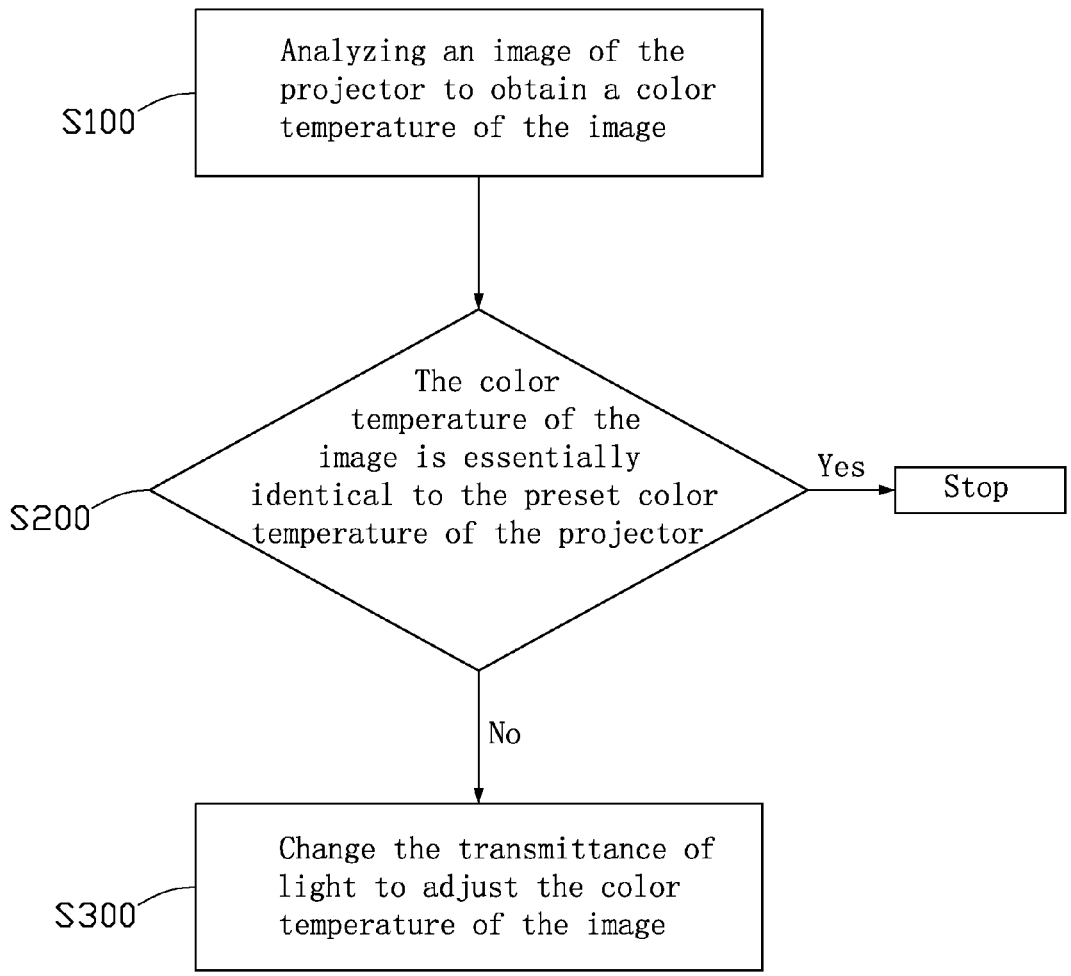
FIG. 2 is a flow chart of a color temperature adjusting method for the projector of FIG. 1.

Referring to FIG. 2, a color temperature adjusting method configured for adjusting a color temperature of an image of a projector 100 is disclosed. The projector 100 is set to a preset color temperature selected by the user for a displaying image. The method includes the steps of:

S100: analyzing the image of the projector 100 to obtain a color temperature of the image;

S200: comparing the color temperature of the image with the preset color temperature of the projector 100. If the color temperature of the image is essentially identical to the preset color temperature, then stop the adjusting process; and S300: if the color temperature of the image is not essentially identical to the preset color temperature, then change the transmittance of light to adjust the color temperature of the image.

In step S100, the color analysis unit 62 analyzes the image to obtain a color temperature and color chromaticity coordinates of the image. The color analysis unit 62 can be an image sensor, e.g. a charge coupled device (CCD) or a complementary metal oxide semiconductor (CMOS).

In step S200, the comparing unit 64 makes a comparison between the color temperature of the image and the preset color temperature of the projector 100. If the color temperature of the image is essentially identical to that of the preset one, then stop the adjusting process.

In step S300, if the color temperature of the image is not essentially identical to that of the preset color temperature, then start adjusting the color temperature. If the color temperature of the image is lower than the preset color temperature, then it means the red light shares a dominate percentage in the primary colors of red, blue, and green of the image. By reducing the red light percentage in the image, the color temperature of the image can be increased. The calculating unit 66 calculates a driving voltage for driving the first adjusting member 44R. The driving unit 68 drives the first adjusting member 44R to rotate to a given degree according to the driving voltage for reducing the transmittance of the red light. The color temperature of the image is then adjusted to be essentially identical to the preset color temperature of the projector 100.

If the color temperature of the image is higher than the preset color temperature, then it means the blue light shares a dominate percentage in the primary colors of red, blue, and green of the image. By reducing the blue light percentage in the image, the color temperature of the image can be decreased. The calculating unit 66 calculates a driving voltage for driving the second adjusting member 44B. The driving unit 68 drives the second adjusting member 44B to rotate to a given degree according to the driving voltage for reducing the transmittance of the blue light. The color temperature of the image is then adjusted to be identical to the preset color temperature of the projector 100.

Compared to conventional projectors, the color temperature adjusting apparatus and method disclosed in the embodiment utilize an adjusting unit arranged in front of the image displaying module for adjusting the transmittance of red, green and blue light to adjust the color temperature of the image. The color temperature of the image is adjusted to be identical to the preset color temperature of the projector.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A projector comprising:
   a light source for emitting light;
   a color filter for splitting the light into three primary color lights;
   three polarizers placed in the respective paths of the color lights;

three liquid crystal display modulators placed downstream of the respective polarizers and configured for modulating the color lights into color images;

a color combiner for combining the color images into a final image;

a projecting lens configured for projecting the final image;

a controlling unit configured for analyzing a color temperature of the image; and an adjusting unit electrically connected to the controlling unit and configured to adjust the color temperature if the analyzed color temperature of the image is not essentially identical to a preset color temperature of the projector, the adjusting unit comprising an adjusting member and a driver, the adjusting member being placed upstream of one of the liquid crystal display modulators; the adjusting member being selected from the group consisting of a polarizer and a retarder; the driver being configured for driving the adjusting member to rotate under control of the controlling unit, thus adjusting the color temperature of the image by changing transmittance of the color light through the adjusting member and the corresponding polarizer.

2. The projector of claim 1, wherein the controlling unit comprises a color analysis unit, a comparing unit, and a calculating unit; the color analysis unit being configured for obtaining a color temperature and color chromaticity coordinates of the image; the comparing unit being configured for making a comparison between the color temperature of the image and a preset color temperature of the projector, the calculating unit being configured for calculating a driving voltage according to the color chromaticity coordinates of the image.

3. The projector of claim 1, wherein the three primary color lights comprising a red light; the adjusting member being placed in the path of the red light, the controlling unit being configured for controlling the driver to rotate the adjustment member to reduce the transmittance of the red light through the adjusting member and the corresponding polarizer if the color temperature of the image is lower than the preset color temperature.

4. The projector of claim 1, wherein the three primary color lights comprising a blue light; the adjusting member being placed in the path of blue light, the controlling unit being configured for controlling the driver to rotate the adjustment member to reduce the transmittance of the blue light through the adjusting member and the corresponding polarizer if the color temperature of the image is higher than the preset color temperature.

5. A method for adjusting a color temperature of an image of a projector, the method comprising:

emitting light splitting the light into three primary color lights;

directing the color lights through corresponding polarizers and liquid crystal display modulators to form color images; an adjusting member being placed upstream of one of the liquid crystal display modulators; the adjusting member being selected from the group consisting of a polarizer and a retarder;

combining the color images into the image;

analyzing the image to obtain a color temperature of the image;

comparing the color temperature of the image with a preset color temperature of the projector; and changing transmittance of the corresponding color light through the adjusting member and the corresponding polarizer by rotating the adjusting member to adjust the color temperature of the image being identical to the preset color temperature.

6. The method of claim 5, wherein analyzing the image further comprises a step of obtaining the color temperature and color chromaticity coordinates of the image.

7. The method of 5, wherein the method further comprises a step of driving the adjusting member to rotate for reducing the transmittance of the corresponding color light through the adjusting member and the polarizer.

8. The method of claim 5, wherein if the color temperature of the image is essentially identical to the preset color temperature, then stop adjusting the color temperature of the image.

9. The method of claim 7, wherein the method further comprises a step of calculating a driving voltage for driving the adjusting member to rotate.

* * * * *